Jan. 18, 1955      M. KNOBEL      2,699,932
CHECK-WEIGHING APPARATUS

Filed Jan. 3, 1952      6 Sheets-Sheet 2

INVENTOR.
Max Knobel
BY
J. Stanley Churchill
ATTORNEY

Jan. 18, 1955
M. KNOBEL
2,699,932
CHECK-WEIGHING APPARATUS
Filed Jan. 3, 1952
6 Sheets-Sheet 3
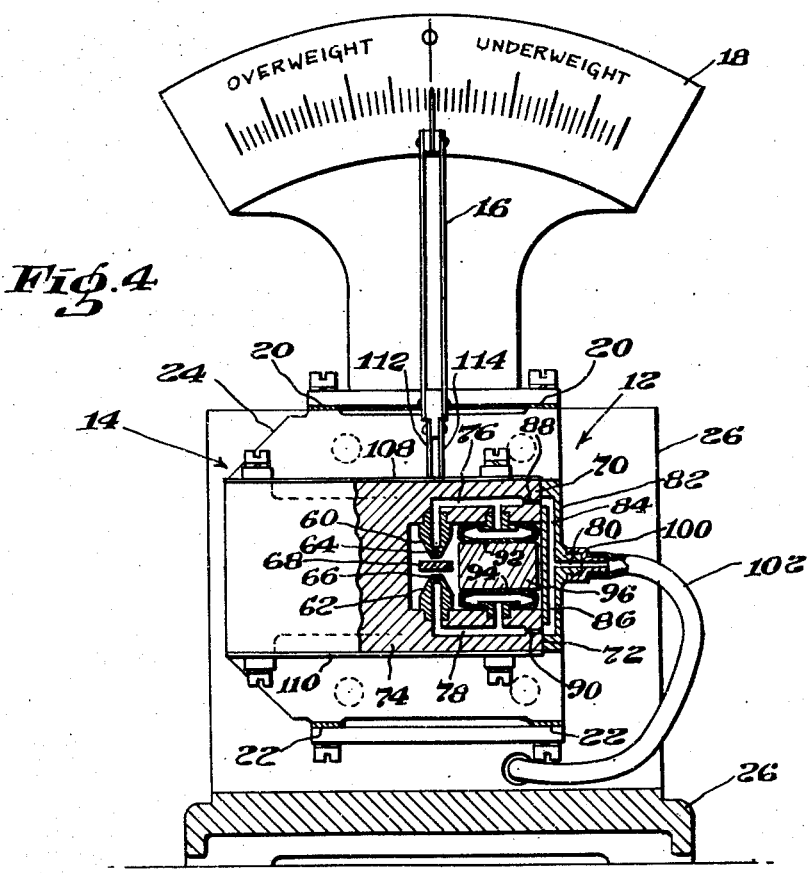
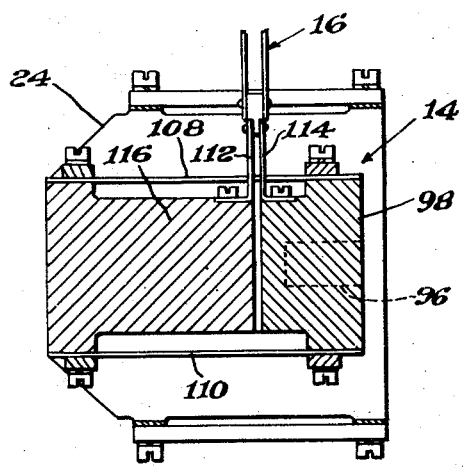
INVENTOR.
Max Knobel
BY
J. Stanley Churchill
ATTORNEY

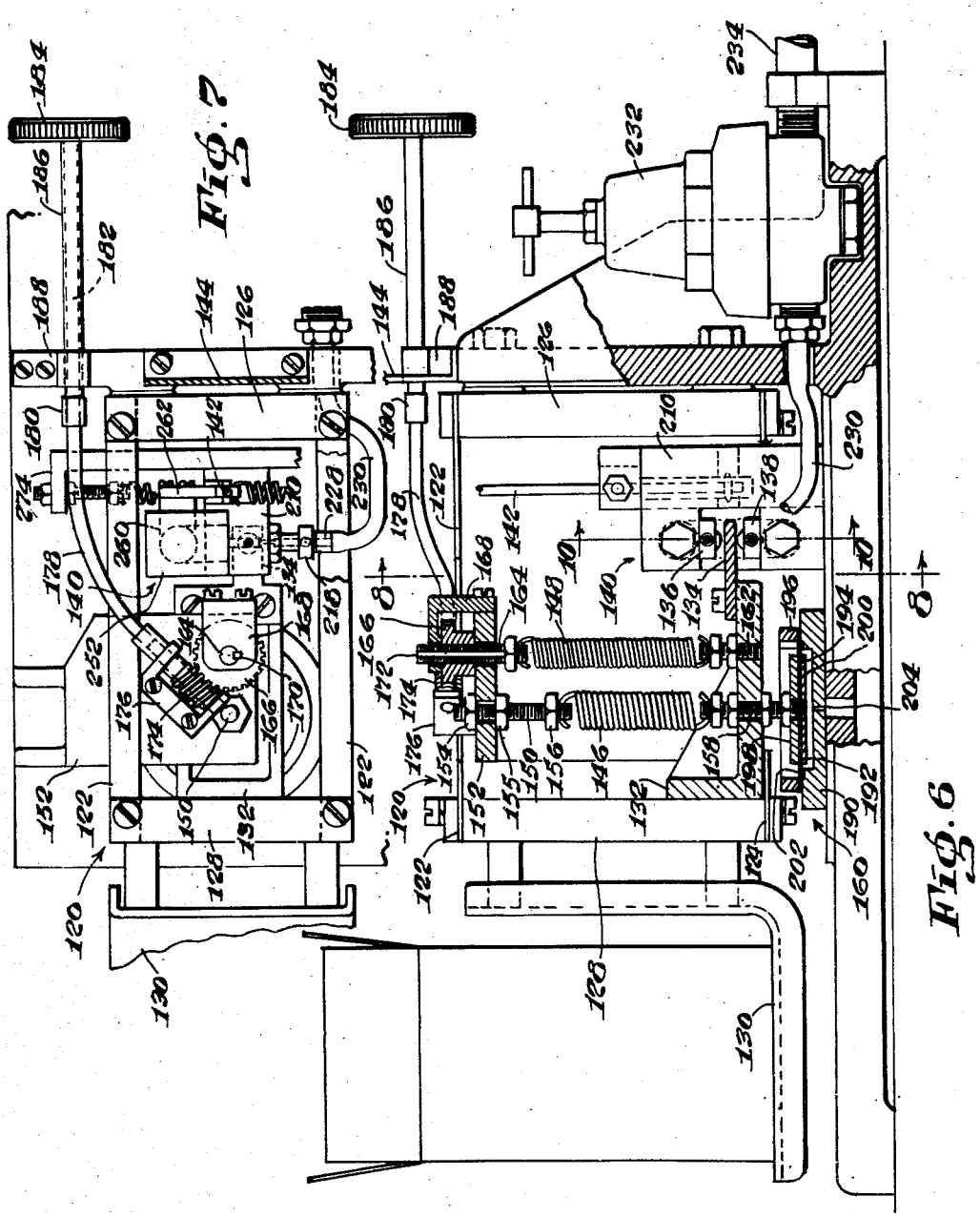

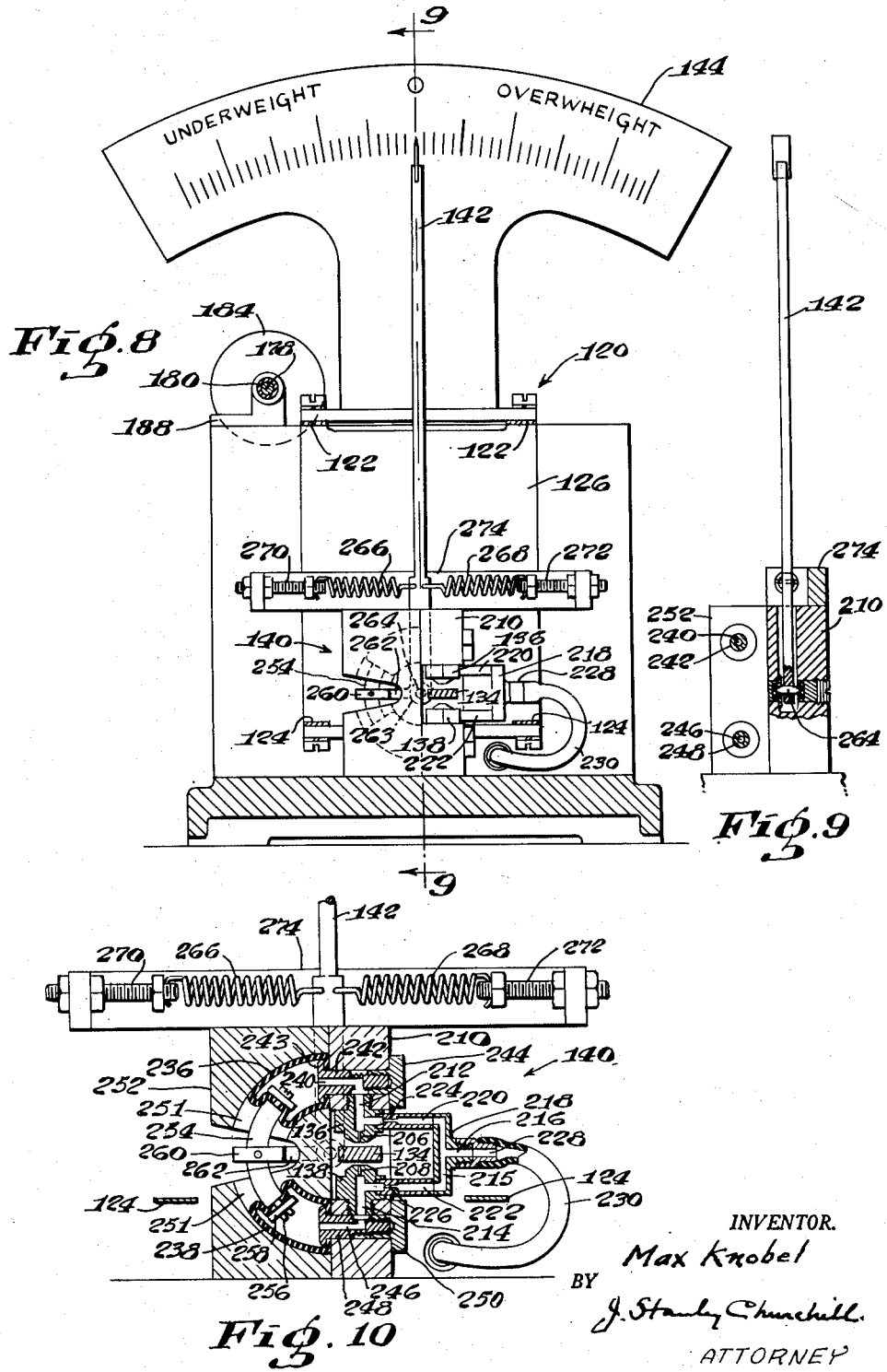

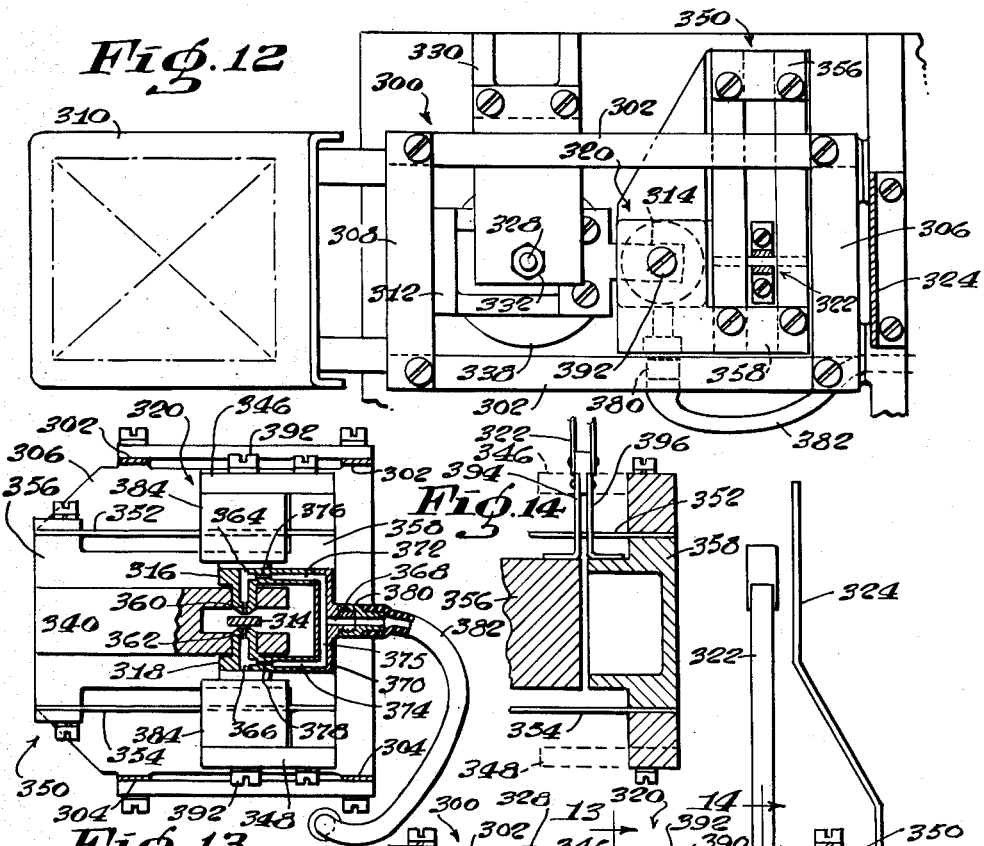
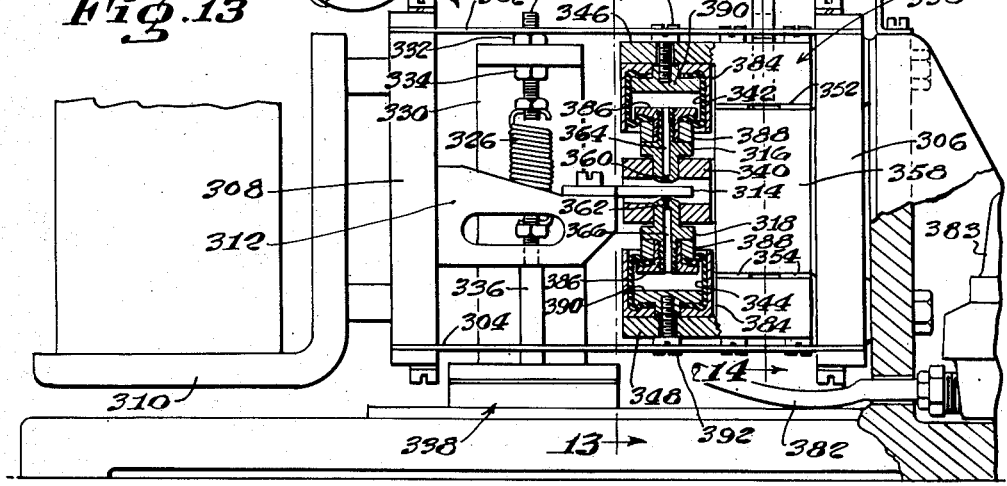

United States Patent Office 2,699,932
Patented Jan. 18, 1955

2,699,932
CHECK-WEIGHING APPARATUS

Max Knobel, Boston, Mass., assignor to Pneumatic Scale Corporation, Limited, Quincy, Mass., a corporation of Massachusetts Application January 3, 1952, Serial No. 264,740

5 Claims. (Cl. 265—68)

This invention relates to a check-weighing apparatus.

The invention has for an object to provide a novel and improved check-weighing apparatus adapted to quickly and accurately check weigh articles and to accurately indicate in a novel and superior manner any deviation over or under a predetermined weight of an article being check weighed.

Another object of the invention is to provide a novel and improved check-weighing apparatus of the character described wherein pneumatically operated pressure-responsive elements are arranged in opposed relation for measuring the displacement of the weighing element and for indicating any deviation from a predetermined weight of an article being check weighed in accordance with the differential pressure set up in opposed pressure-responsive elements.

With these general objects in view, and such others as may hereinafter appear, the invention consists in the check-weighing apparatus and in the various structures, arrangements and combinations of parts hereinafter described and particularly defined in the claims at the end of this specification.

Figure 1:
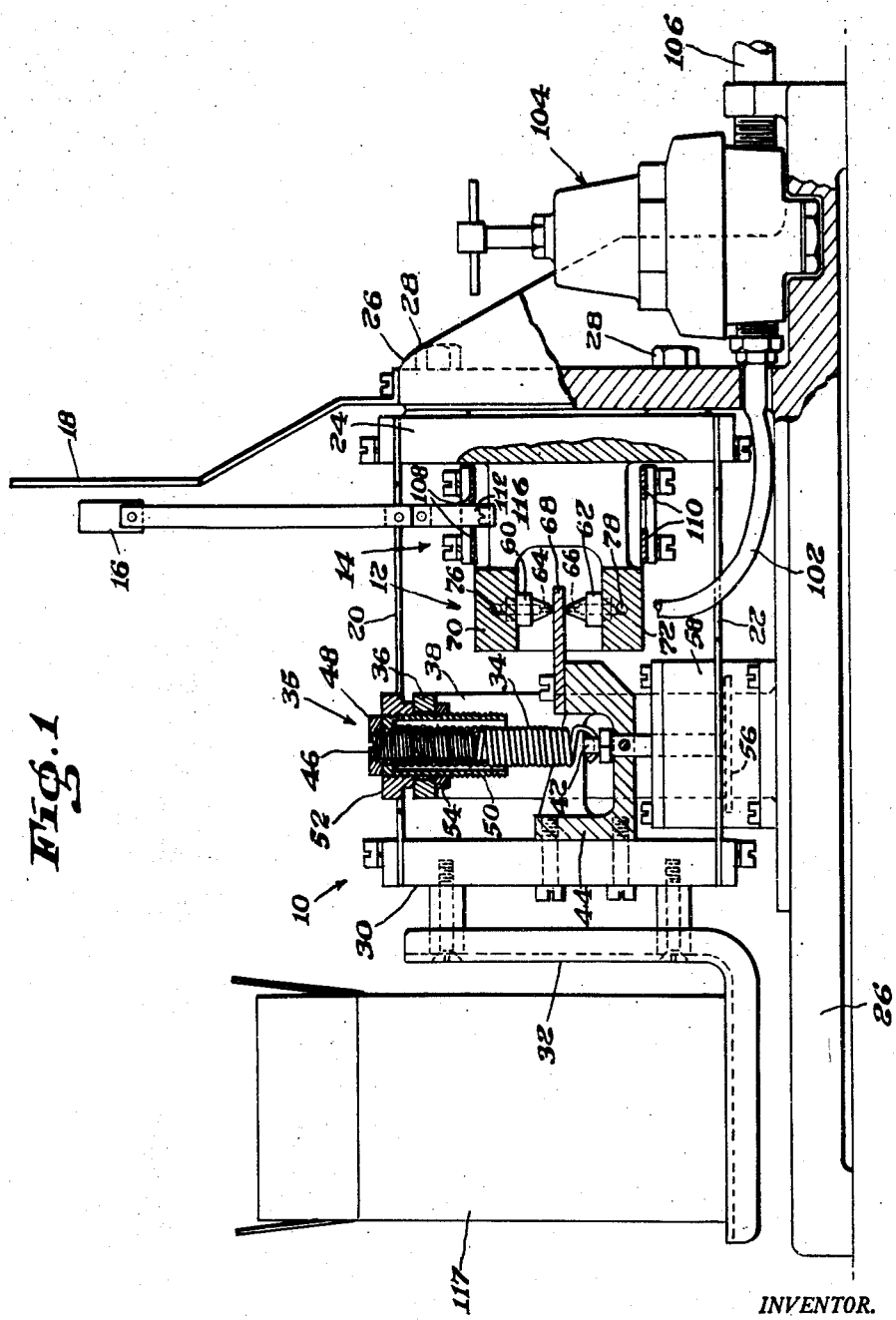
Figure 2:
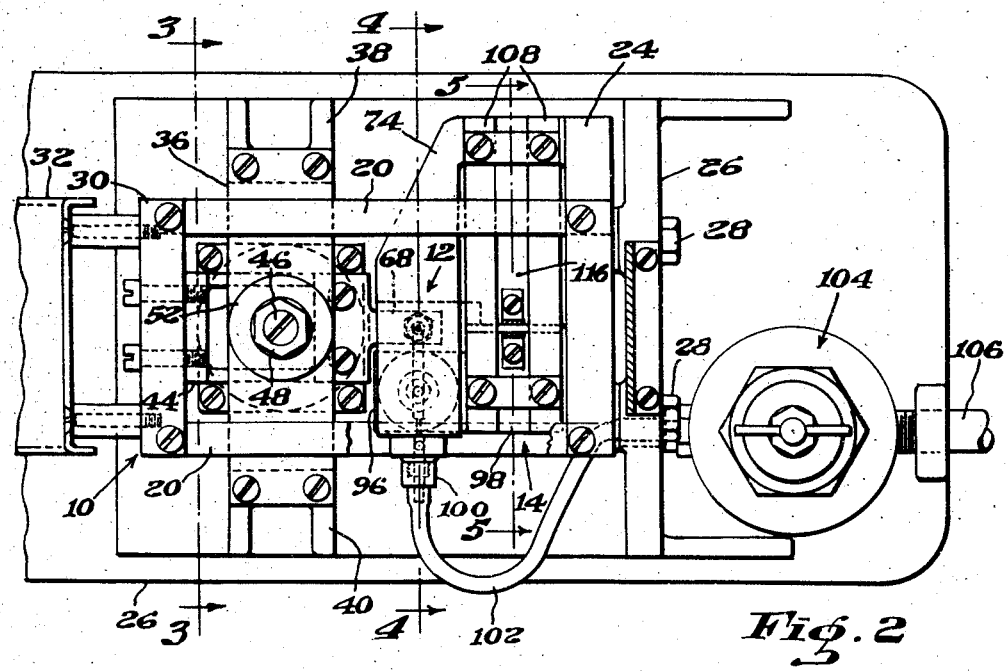
Figure 3:
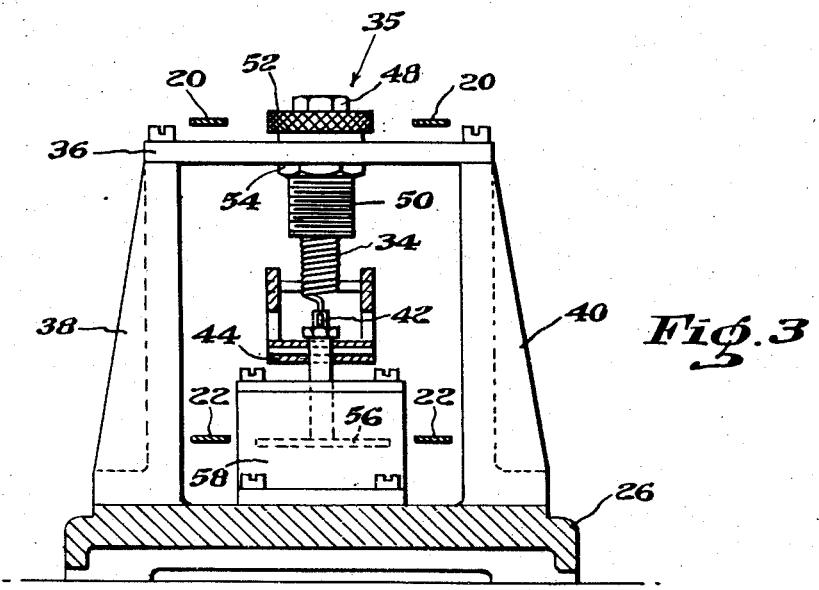

In the drawings illustrating the preferred embodiment of the invention, Fig. 1 is a side elevation, partly in cross section, of the present check-weighing device; Fig. 2 is a plan view of the same; Fig. 3 is a cross-sectional view taken on the line 3—3 of Fig. 2; Fig. 4 is a cross-sectional view taken on the line 4—4 of Fig. 2 and illustrating the pneumatically operated differential pressure-gauging unit; Fig. 5 is a cross-sectional view taken on the line 5—5 of Fig. 2; Fig. 6 is a side elevation, partly in cross section, of a modified form of check-weighing device embodying the present invention; Fig. 7 is a partial plan view of the same; Fig. 8 is a cross-sectional view taken on the line 8—8 of Fig. 6; Fig. 9 is a detail view in cross section as seen from the line 9—9 of Fig. 8; Fig. 10 is an enlarged cross-sectional detail view of the pneumatically operated differential pressure-gauging unit employed in the modified form of the invention, the section being taken on the line 10—10 of Fig. 6; Fig. 11 is a side elevation, partly in cross section of another modified form of check-weighing device embodying the present invention; Fig. 12 is a partial plan view of the same; Fig. 13 is a detail view, partly in cross section, as viewed from the line 13—13 of Fig. 11; and Fig. 14 is a cross-sectional detail view taken on the line 14—14 of Fig. 11.

In general, the present invention contemplates novel check-weighing apparatus capable of extremely rapid and accurate check-weighing performance to indicate any deviation from a predetermined weight of an article, such as a previously filled package produced in an automatic weighing or filling machine. In the illustrated and preferred embodiment of the invention, the weighing element is shown as comprising a cantilever spring beam having opposed pneumatically operated pressure-responsive elements cooperating therewith and adapted to be actuated upon minute movement of the cantilever beam when a filled package is placed on the weighing platform to set up a differential pressure in opposed pressure-responsive elements, any deviation in the weight of the package from a predetermined normal weight being accurately indicated by indicating means operatively connected to the differential pressure elements.

In the operation of measuring the displacement of the weighing beam by pneumatically operated means, the pressure of the main source or supply of compressed air is preferably regulated, since such pressure is a factor in the determination of the weight of the article being check weighed as indicated by the displacement of the weighing element. In practice, commercially available pressure regulators cannot always be relied upon to maintain an absolute uniform pressure at all times and may fluctuate considerably, thus affecting the accuracy of the check-weighing operation. In accordance with an important feature of the present invention, two pneumatically operated pressure-responsive elements are arranged in opposed and counteracting relation for cooperation with the weighing beam and are supplied with compressed air from a common source so that any fluctuation in pressure in the main supply line will not impair the accuracy of the check-weighing operation. In other words, in the operation of the check-weighing device, when the displacement of the weighing beam effects an increase in the pressure in one element, the pressure in the opposing element is correspondingly decreased so that the difference in the pressure of the opposing elements becomes the determining factor of the indicated weight rather than a pressure dependent upon an absolute uniform source. Thus, in the present check-weighing device, a correct reading of deviations in weight of the articles being check weighed may be obtained irrespective of variations in the pressure of the air supplied to the pneumatically operated units within predetermined limits.

Referring now to the drawings, and particularly to Figs. 1 to 5, the present check-weighing device is adapted to indicate any deviation over or under a predetermined weight of a load placed on the check-weighing platform, and in general, comprises a cantilever spring-beam weighing unit, indicated generally at 10; a pneumatically operated differential pressure-gauging unit 12 arranged to cooperate with the spring-beam weighing unit; and a second cantilever spring-beam unit, shown generally at 14, which is arranged to be moved by and in accordance with the differential pressure indicated by the pneumatic gauging unit upon deflection of the weighing beam 10 when a load is placed on the platform thereof. A pointer 16 actuated by the movement of the second cantilever spring-beam unit 14 is arranged to cooperate with a dial 18 which may be graduated to indicate the weight deviation of the load in ounces or fractions thereof.

As illustrated in Figs. 1 and 2, the cantilever spring-beam weighing unit 10 comprises a four-bar parallel linkage including a pair of upper and a pair of lower horizontal links 20, 22 respectively comprising relatively stiff cantilever leaf springs of equal length. The cantilever springs 20, 22 are fixed at one end to a rigid immovable member or bracket 24 attached to the machine frame 26 as by bolts 28, and the other ends of the leaf springs 20, 22 are attached to a second rigid member or block 30 to which the weighing platform 32 is secured, as illustrated. The two rigid members 24, 30 together with the springs 20, 22 constitute the four-bar linkage so that when a load is placed on the platform 32, the weight thereof results in imparting to the platform a straight-line motion in a vertical direction. The first rigid member or bracket 24, being attached to the machine frame serves as a rigid support for the entire structure of the beam, and as herein shown, a coil spring 34 adjustably connected to the free end of the beam unit 10 serves to exert a counterforce upon the spring beam so that the desired degree of stiffness may be obtained in the cantilever springs, and consequently the desired degree of weighing sensitivity can be obtained irrespective of the weight of the platform and a filled package placed thereon. The upper end of the coil spring 34 is operatively connected to an adjusting unit, indicated generally at 35, which is supported upon a cross bar 36 attached to the upper ends of uprights 38, 40 of the machine frame, as shown in Fig. 3, the lower end of the spring 34 being hooked into a stud 42 fast in a bracket 44 attached to and extended from the rigid member or block 30. Provision is made in the illustrated adjusting unit 35 for effecting an initial coarse adjustment of the spring 34 and a subsequent fine adjustment, and as herein shown, the upper end of the coil spring is wound about and fitted into the threads of a fine-adjustment screw 46, the latter being provided with a nut 48 at its upper end which is arranged to bear against the upper end of a hollow externally threaded adjusting member 50 provided with a knurled adjusting nut 52 which in turn is supported upon the cross bar 36. A lock nut 54 serves to retain the adjusting member 50 in its adjusted position. Thus, in operation, coarse adjustment may be effected by loosening the lock nut 54 and rotating the knurled nut 52 while holding the hollow threaded member 50 stationary to effect axial movement of the screw 46 thereby extending or contracting the spring 34 in accordance with the direction of rotation of the adjusting nut 52, whereupon the lock nut 54 may again be tightened. Thereafter, fine adjustment of the spring may be effected by rotating the screw 46 by means of a screw driver inserted in the slot formed therein while holding the nut 48 stationary. Rotation of the screw in one direction will draw the coils of the spring farther up on the threads of the screw to extend the spring, and rotation in the other direction will tend to withdraw the screw from the coils to retract the spring. In order to damp any undesirable vibratory oscillations of the spring-beam unit 10 during the weighing operation, the lower end of the stud 42, which may be pinned or otherwise secured to the bracket 44, is extended downwardly and provided with a piston 56 projecting into an oil dash pot 58 attached to the machine frame.

As herein shown, provision is made for measuring or indicating the deflection of the spring-beam unit 10 when depressed by the load being check weighed, and more particularly, any deviation over or under a predetermined weight. In practice, the stiff cantilever springs are selected so that the weighing beam has a relatively small deflection value, and sensitive, pneumatically operated gauging means, indicated at 12, is arranged to cooperate with the cantilever weighing beam 10 for indicating or measuring the relatively small deflection of the spring beam when depressed by the load placed on the platform 32.

In the illustrated embodiment of the invention, the pneumatically operated gauging means 12 comprises a pair of opposed air jets including an upper air jet 60 and a lower air jet 62 each provided with a small discharge orifice 64, 66 respectively and which are arranged to cooperate with a vane 68 extended from the bracket 44 attached to the rigid member 30 of the spring-beam weighing unit 10, the vane 68 being extended between the opposed air jets 60, 62. As best shown in Fig. 4, the air jets 60, 62 are mounted in opposed upper and lower arms 70, 72 of an extension 74 from the rigid bracket 24, each jet forming extensions of similar chambers 76, 78 arranged to be supplied with air under pressure through an inlet 80 formed in an end plate 82 connected between the arms 70, 72 of the extension 74. The inlet 80 is arranged to communicate with the upper and lower chambers 76, 78 through passageways 84, 86 and through restricted throat portions 88, 90 respectively, as shown. The chambers 76, 78 are further arranged to communicate with opposed pressure-responsive elements herein shown as comprising upper and lower bellows 92, 94, the upper bellows 92 being connected in the chamber 76 between the small orifice 64 and the throat portion 88, and the lower bellows 94 being connected in the chamber 78 between the small orifice 66 and the restricted throat portion 90. The bellows 92, 94 are arranged to bear against the upper and lower faces respectively of a projection 96 formed integrally with a rigid member comprising a block 98 forming a part of the second cantilever spring-beam unit 14. The inlet 80 may be connected to the source of compressed air by a hose nipple 100 and a flexible hose 102 to a commercially available air-pressure regulator, indicated generally at 104 to which air is supplied through a pipe 106 from any usual source of compressed air. In operation, when the vane 68, which in effect comprises a valve, is disposed in an intermediate position equally spaced from both of the orifices 64, 66 the pressures in the bellows 92, 94 are equal, and when the vane is moved toward one or the other of the orifices, the pressure in the respective chamber is substantially increased to expand the particular bellows communicating therewith, the pressure in the other chamber and bellows being proportionately decreased thus providing a differential pressure by which movement of the second cantilever spring-beam unit 14 may be effected.

As herein illustrated, the second cantilever spring-beam unit 14 is arranged at right angles to the first spring-beam unit and comprises a similar four-bar parallel linkage including a pair of upper and a pair of lower horizontal links 108, 110 respectively comprising cantilever leaf springs of equal length. The springs 108, 110 are fixed at one end to a portion of the rigid bracket 24, see Fig. 5, and the other ends of the springs are attached to the rigid block 98 from which the projection 96 is extended between the bellows 92, 94.

The pointer 16 cooperating with the dial 18 may be operatively connected between the second spring-beam unit 14 and a stationary portion of the device in a manner such as to translate the vertical movement of the second beam unit 14 into arcuate movement whereby to enable any deviation over or under a predetermined weight to be read directly from the graduated dial 18. As herein shown, see Fig. 5, the pointer 16 is provided with a pair of parallel legs 112, 114 of flexible metal, such as leaf springs of equal length, one of the legs, 112, being mounted fast on an intermediate portion 116 of the supporting bracket 24, and the other leg 114 being mounted fast on the rigid block 98 of the unit 14. Thus, in operation, downward movement of the block 98 will pull the leg 114 down and effect flexing of the opposite leg 112 to rock the pointer 16 to the right, and conversely, upward movement of the block 98 will extend the leg 114 and effect flexing of the leg 112 to move the pointer to the left.

In the operation of the check-weighing device, as illustrated in Figs. 1 to 5, when it is desired to test or check weigh a previously formed load, herein shown as a filled carton 117, previously supplied with a weighed or measured load by a packaging machine, the cantilever spring-beam weighing unit 10 is first adjusted by means of the adjusting unit 35 so that when a predetermined normal weight is placed on the platform 32, the spring-beam unit 10 will be depressed to present the vane 68 from an initial elevated position to an intermediate position equally spaced from the upper and lower orifices 64, 66, thus causing equal pressures to occur in the opposed bellows. The equal pressures in the bellows 92, 94 will maintain the second spring-beam unit 14 in an intermediate position with the pointer 16 directed at a central or zero position on the dial 18 indicating that the load corresponds to the predetermined normal weight.

The pneumatically operated differential pressure unit is so constructed that a large pressure change occurs in the chambers 76, 78 upon movement of the spring-beam unit 10 through a minute distance, and when an underweight load is placed on the platform 32, the deflection of the spring-beam unit 10 will move the vane 68 a minute distance from the upper orifice 64, less than the intermediate position of the vane, so that a relatively great pressure occurs in the upper bellows 92, the pressure in the lower bellows 94 being correspondingly less due to the relatively greater distance of the vane from the lower orifice 66. Thus, the second spring-beam unit 14 will be moved downwardly a relatively small distance in accordance with the differential pressure causing the pointer 16 to be rocked to the right a distance proportionate to the underweight deviation of the load from the predetermined normal weight. Conversely, when an overweight load is placed on the platform 32, the deflection of the spring-beam unit 10 will move the vane 68 toward the lower orifice 66 a distance beyond the intermediate position, thus substantially increasing the pressure in the lower bellows 94 and correspondingly decreasing the pressure in the upper bellows 92. As a result, the second spring-beam unit 14 will be moved upwardly under the influence of the differential pressure, causing the pointer 16 to be rocked to the left a distance proportionate to the overweight deviation of the load from the predetermined normal weight.

From the above description of the embodiment of the invention illustrated in Figs. 1 to 5, it will be seen that the present check-weighing device includes two cantilever spring-beam units 10, 14 having pneumatically operated differential pressure means 12 including opposed pressure-responsive elements cooperating therewith, the differential pressure means being responsive to minute deflection of the first beam unit 10 and arranged to effect movement of the second beam unit 14 in accordance with the differential pressure set up in the opposed pressure-responsive elements when a load is placed on the weighing platform 32, the amount of deviation over or under a predetermined normal weight of the load being check weighed being directly readable from the dial 18. One advantage of the above-defined structure lies in the fact that the source of air pressure supplied to and common to both upper and lower portions of the opposed pressure-responsive elements may vary considerably without impairing the accuracy of the weight indicated. In other words, a uniform and unvarying air pressure from the source of supply need not be maintained because the difference in the pressure occurring between opposed pressure-responsive elements, having a common source of air supply, is being measured by the gauging unit so that the same reading will be obtained with a particular weight irrespective of variations, within reasonable limits, of the air-pressure source.

Referring now to Figs. 6 to 10, a modified form of the present check-weighing device embodies a cantilever spring-beam weighing unit 120 similar in construction and mode of operation to the unit 10 above described, and wherein the relatively stiff cantilever leaf springs 122, 124 of equal length are fixed at one end to a bracket 126 attached to the machine frame, the other ends of the leaf springs being attached to a block 128 to which the weighing platform 130 is secured, thus providing a four-bar parallel linkage imparting to the platform a straight-line vertical movement when a load is placed thereon. The block 128 is provided with a bracket 132 extending inwardly therefrom which is arranged to support a valve or vane 134 extended between upper and lower air nozzles 136, 138 respectively of the pneumatically operated differential pressure-gauging means indicated generally at 140. A pointer 142 operatively connected to the differential pressure-responsive means is arranged to cooperate with a dial 144 graduated to indicate in ounces or fractions thereof the deviation from a predetermined weight of a load placed on the platform 130.

In the modified form of the check weigher illustrated in Fig. 6, the provision for exerting a counterforce upon the spring beam 120 so that the desired degree of weighing sensitivity can be obtained, irrespective of the weight of the platform and a filled package placed thereon, may comprise a coarse-adjustment coil spring 146 and a fine-adjustment coil spring 148. As herein shown, the coarse-adjustment spring 146 may be connected at its upper end to a threaded spring stud 150 adjustably mounted in a bracket 152 by upper and lower nuts 154, 155, a third nut 156 being tightened against the spring loop hooked into the stud to lock the spring thereto. The lower end of the coarse spring 146 may be similarly connected to a threaded stud 158 adjustably secured to the bracket 132, the lower end of the stud being extended and connected to an air dash pot indicated generally at 160 to be hereinafter described.

The fine-adjustment coil spring 148 is connected at its lower end to a spring stud 162 threadedly engaged in the bracket 132 and is connected at its upper end to a spring stud 164 threadedly engaged with a worm gear 166 supported for rotation between the upper surface of the bracket 152 and a retaining member 168 attached to the bracket. The stud 164 extends through clearance openings in the bracket and the retaining member and is restrained from rotation by a key 170 fixed in the bracket and extended into a keyway 172 formed in the stud so that upon rotation of the worm gear 166 the stud 164 is moved axially to effect adjustment of the coil spring 148. Provision is made for manually rotating the worm gear 166, and as herein shown, a worm 174 meshing with the gear 166 and rotatably supported in a bracket 176 attached to the bracket 152 is connected to one end of a flexible shaft 178. The other end of the flexible shaft 178 is connected by a coupling 180 to a shaft 182 having a knurled handwheel 184 at its outer end, the shaft 182 being rotatably supported in a tubular member 186 fixed in a bracket 188 attached to the machine frame. In operation, a predetermined exact weight corresponding to the weight to be check weighed may be placed on the platform 130, and the coarse spring 146 may be first adjusted to obtain the approximate setting of the counterforce tension, and thereafter the fine spring 148 may be adjusted by rotating the handwheel 184 to obtain an exact setting to dispose the vane 134 in an intermediate position between the air nozzles 136, 138 of the pneumatically operated differential pressure-gauging means and with the pointer 142 set at the "0" position on the overweight and underweight dial 144.

The novel air dash pot 160 herein shown for damping undesirable vibratory oscillations may comprise a housing or base member 190 having a relatively shallow chamber 192 and provided with a thin flexible sheet, such as a thin rubber sheet 194 supported across the upper or open end of the chamber in a substantially relaxed or unstretched condition, the flexible sheet being attached to the base member by an annular retaining member 196 secured in airtight relation thereto. The extended end of the stud 158 may be clamped to the flexible sheet 194 by upper and lower clamping disks 198, 200, the disks covering a major portion of the sheet area, as illustrated, leaving a relatively narrow annular portion 202 of the sheet free and exposed between the edge of the clamping disks and the inner surface of the annular retaining member 196. A small opening 204 formed in the base member affords restricted communication between the chamber 192 and the atmosphere for controlling the flow of air into and out of the chamber. In practice, the size of the opening 204 may be varied to effect different damping characteristics for different weights or frequencies of vibration, or the opening 204 may be provided with a needle valve, not shown, for adjusting the opening for most efficient performance of the damping device for the particular weight being check weighed.

In operation, the air-damping device operates with minimum hysteresis having less viscosity than a fluid, such as oil used in the conventional dash pot, and the damping effect may be conveniently controlled by varying the size of the opening 204. A further advantage of the illustrated damping device is that it may be of a relatively small size as compared to a conventional oil dash pot for controlling vibrations of equal amplitude.

As best shown in Fig. 10, the pneumatically operated gauging means 140 in the modified form of check weigher may comprise the opposed upper and lower nozzles or air jets 136, 138, each provided with a small discharge orifice 206, 208 respectively and arranged to cooperate with the vane 134 extended from and movable with the free end of the spring-beam weighing unit 120. As herein shown, the nozzles 136, 138 are supported in upper and lower arms of a block 210 mounted on the base of the device, each nozzle having an air chamber 212, 214 respectively arranged to be supplied with a source of air under pressure through an inlet 216 formed in an end plate 218 connected between passageway tubes 220, 222 extended from the sides of the nozzles 136, 138 respectively. The inlet 216 is arranged to communicate with the upper and lower chambers 212, 214 through the common passageway 215, passageways 220, 222, and through restricted throat portions 224, 226 respectively, as shown. The inlet 216 may be connected to the source of compressed air by a hose nipple 228 and a flexible hose 230 to a commercially available air-pressure regulator 232 to which air may be supplied by a pipe 234 from any usual or preferred source.

The chambers 212, 214 are further arranged to communicate with opposed pressure-responsive elements herein shown as comprising upper and lower arcuate rolling or rollably expansible bellows 236, 238, the upper bellows 236 being connected to the chamber 212 by a passageway 240 formed in a stud 242 provided with a head 243 and having a reduced-diameter threaded portion for cooperation with a headed nut 244. The threaded stud 242 and nut 244 are extended through opposite ends of an opening in the upper end of the block 210, and the edges of the open end of the bellows 236 are inserted under the head 243 of the stud so that when the headed nut 244 is tightened the bellows 236 is clamped in airtight relation to the block 210 and in communication with the upper chamber 212. The lower arcuate rolling bellows 238 is similarly connected in communication with the lower chamber 214 through passageway 246 formed in the stud 248, the head of the stud being arranged to clamp the edges of the open end of the bellows in airtight relation to the block by tightening the headed nut 250.

The upper and lower bellows 236, 238 may be made of rubber or like flexible material and are constrained to expand and retract in an arcuate path 251 formed in a block 252 attached to or formed integrally with the block 210. As herein shown, the closed ends of the opposed bellows may be turned inwardly upon themselves and are connected together by a rigid arcuate member 254, the latter being of a length such as to extend partway into each bellows, as shown. The rigid arcuate member may be connected to the ends of opposed bellows by screws 256 and washers 258, and the arcuate member is further provided with a laterally extended arm 260 pinned intermediate the ends thereof, the arm 260 being directly connected to an arm 262 extended from the hub 263 of the pivotally mounted pointer 142. As shown in Figs. 8 and 10, the center of the pointer pivot occurs in axial alignment with the center of the radius of the arcuate path 251, and as better shown in Fig. 9, the pointer 142 is mounted on a trunnion pin 264 mounted to rock in small ball bearings supported in the block 210. The pointer 142 is further provided with opposed coil springs 266, 268 of equal length connected thereto and to opposed spring studs 270, 272 adjustably mounted at the ends of an elongated bracket 274 attached to the top of the block, the adjustably mounted opposing springs being arranged to set and maintain the pointer at zero position and to maintain the opposed bellows and their connecting member 254 in an intermediate position when the air is cut off. Thus, when the spring-beam unit 120 is adjusted as described to present the vane 134 in an intermediate position between the nozzles 136, 138 with a predetermined normal load placed on the platform 130 with the air turned on, the pressures in the upper and lower bellows will be equal and the pointer will remain in the zero position, the vane 134 being moved upwardly from the intermediate position when the load is removed.

The pneumatically operated differential pressure unit 140 is so constructed that a large pressure change occurs in the chambers 212, 214 upon movement of the spring-beam unit 120 through a minute distance, and in the operation of the check-weighing device illustrated in Figs. 6 to 10, when an underweight load is placed on the platform, the deflection of the beam will move the vane a minute distance from the upper orifice 206, less than the intermediate position, thus causing an increase in pressure in the upper chamber 212, the pressure in the lower chamber 214 being correspondingly reduced due to the relatively greater distance of the vane from the lower orifice 208. As a result, the upper bellows 236 is unrolled along the arcuate path 251 and the lower bellows is rolled further inwardly to move the rigid connecting member 254 in a counterclockwise direction, thus rocking the pointer 142 to the left, viewing Fig. 8, a distance proportionate to the underweight deviation of the load from the predetermined weight. Conversely, when an overweight load is placed on the platform 130, the deflection of the spring-beam unit 120 will move the vane 134 toward the lower orifice 208 a distance beyond the intermediate position, thus substantially increasing the pressure in the lower chamber 214 and correspondingly decreasing the pressure in the upper chamber, and as a result, the lower bellows is unrolled and the upper bellows is rolled inwardly, thus rocking the pointer to the right a distance proportionate to the overweight deviation of the load from the predetermined normal weight.

From the description thus far, it will be seen that the modified form of check weigher illustrated in Figs. 6 to 10 includes but one cantilever spring-beam unit 120, and a pneumatically operated differential pressure means 140 cooperating therewith which includes opposed pressure-responsive elements comprising rollably mounted bellows 136, 138 constrained to move in an arcuate path and responsive to minute deflections of the cantilever beam unit in accordance with the differential pressures set up in the opposed pressure-responsive elements when a load is placed on the weighing platform 130. In operation, the rollably mounted bellows are extremely sensitive and quickly respond to any changes in pressure by merely rolling in or out without any stretching of the bellows and with minimum hysteresis. The rolling bellows require but a relatively small volume of air so that the unit may be constructed to occupy a relatively small space while at the same time providing a relatively large linear or arcuate movement to measure a substantially large range of pressure differences. The arcuate construction of the opposed bellows permits direct connection to the dial without amplifying linkage, and in operation, the amount of deviation over or under a predetermined normal weight may be directly read from the dial. In practice, the air pressure maintains the inner surfaces of the bellows spaced apart so that no friction occurs between the folded-over or turned-in portions of the bellows during the operation of the unit. In common with the check-weighing device illustrated in Figs. 1 to 5, the modified differential pressure unit shown in Fig. 10 will maintain a substantially constant zero position irrespective of fluctuations in air pressure since both opposed chambers of the unit are supplied with compressed air from a common source.

Referring now to Figs. 11 to 14, another modification of the present check-weighing device embodies a cantilever spring-beam weighing unit 300 similar in construction and mode of operation to the unit 10 above described, and wherein the relatively stiff cantilever leaf springs 302, 304 of equal length are fixed at one end to a bracket 306 attached to the machine frame, the other ends of the leaf springs being attached to a block 308 to which the weighing platform 310 is secured, thus providing a four-bar parallel linkage imparting to the platform a straight-line vertical movement when a load is placed thereon. The block 308 is provided with a bracket 312 extending inwardly therefrom which is arranged to support a valve 314 extended between upper and lower air nozzles 316, 318 respectively of the pneumatically operated differential pressure-gauging means, indicated generally at 320. A pointer 322 operatively connected to the differential pressure-responsive means is arranged to cooperate with a dial 324 graduated to indicate in ounces the deviation from a predetermined weight of a load placed on the platform 310. As illustrated in Fig. 11, the provision for exerting a counterforce upon the spring beam 300, so that the desired degree of weighing sensitivity can be obtained irrespective of the weight of the platform and a filled package placed thereon, may comprise a coil spring 326 connected at its upper end to a threaded spring stud 328 adjustably mounted in a bracket 330 by upper and lower nuts 332, 334. The lower end of the spring 326 may be connected to a stud 336 adjustably secured to the bracket 312, the lower end of the stud being extended and connected to an air dash pot, indicated generally at 338, which may and preferably will be similar in construction and mode of operation to the pneumatic dashpot unit 160 shown in Fig. 6.

In the modified form of pneumatically operated differential pressure-gauging means 320, shown in Figs. 11 and 13, the upper and lower nozzles 316, 318 are supported in opposed relation in upper and lower arms of an extension 340 from the bracket 306 and are directly connected to upper and lower bellows units comprising straight-line rolling-tube bellows 342, 344 which in turn are attached at their free ends to upper and lower arms 346, 348 respectively extended from and forming a part of a second cantilever spring-beam unit, indicated generally at 350. The second cantilever spring-beam unit is arranged at right angles to the spring-beam weighing unit 300 and comprises a similar parallel four-bar linkage including upper and lower pairs of leaf springs 352, 354 respectively fixed at one end to an extended portion 356 of the rigid bracket 306, see Fig. 13, the other ends of the springs being attached to a block 358 from which the arms 346, 348 are extended.

The upper and lower nozzles or air jets 316, 318 are each provided with a small discharge orifice 360, 362 respectively in communication with air chambers 364, 366 arranged to be supplied with a source of air under pressure through an inlet 368 formed in an end plate 370 connected between passageway tubes 372, 374 extended from the sides of the nozzles 316, 318, as shown in Fig. 13. The inlet 368 is arranged to communicate with the upper and lower chambers 364, 366 through the common passageway 375, passageways 372, 374, and through restricted throat portions 376, 378 respectively. The inlet 368 may be connected to a source of compressed air by a hose nipple 380 and a flexible hose 382 to a commercially available air-pressure regulator indicated at 383.

The air chambers 364, 366 of the air nozzles 316, 318 are in direct communication with the opposed pressure-responsive elements comprising the rolling bellows 342, 344, and as herein shown, each pressure-responsive unit comprises a cylindrical rubber tube supported for straight-line linear movement in a hollow cylindrical member 384. Each tube 342, 344 is attached at one end to its respective air nozzle by a flanged nut 386 engaged with a threaded portion of the nozzle, the edges of the tube being clamped between the flange and a spacing collar 388 supported on a flanged portion of the nozzle. The other end of each tube is clamped between the end wall of the cylindrical member 384 and a flange nut 390 which may be secured to their respective arms 346, 348 of the second cantilever spring-beam unit 350 by bolts 392, as shown in Fig. 11. The end of each tube 342, 344 adjacent its respective air nozzles 316, 318 is turned inwardly upon itself, and the tube is restrained from radial expansion by the side walls of the hollow cylindrical member 384.

The air nozzles 316, 318 are so constructed that a large pressure change occurs in the chambers 364, 366 upon movement of the valve 314 through a minute distance, and in operation, any increase in the air pressure in one of the opposed bellows is accompanied by a corresponding decrease in pressure in the other bellows, the bellows being arranged to roll or peel on or from their restraining surfaces to effect movement of the second cantilever beam unit 350 a distance proportionate to any deviation over or under a predetermined normal weight of a load placed on the platform 310. As herein shown, such movement is arranged to move the pointer 322 which may be of a structure similar to that shown in Fig. 1 wherein the pointer is provided with a pair of parallel legs 394, 396 of flexible metal, one of the legs, 394, being mounted on the extended portion 356 of the bracket 306, the other leg, 396, being mounted on the block 358 of the second cantilever beam unit, the flexible legs operating to move the pointer to the left or to the right in accordance with movement of the beam unit 350 upwardly or downwardly, respectively, as previously described herein.

In practice, the counterforce spring 326 may be adjusted so that when a predetermined normal weight is placed on the platform 310, the spring-beam unit 300 will be depressed to present the valve 314 at an intermediate position equally spaced from the upper and lower orifices 360, 362 of the air nozzles, thus causing equal pressures to occur in the opposed bellows. The equal pressures will maintain the second spring-beam unit 350 in an intermediate position with the pointer directed to a central or zero position. As in the previously described embodiments, when no load is placed on the platform 310, the valve 314 will be disposed adjacent the upper nozzle 316, and when an underweight load is placed on the weighing platform, the deflection of the spring beam 300 will move the valve 314 a minute distance from the upper orifice so that a relatively great pressure occurs in the upper bellows 342, the pressure in the lower bellows 344 being correspondingly less. Thus, the second spring-beam unit 350 will be moved upwardly in accordance with the differential pressure causing the pointer 322 to be moved to the left a distance proportionate to the underweight deviation of the load from the predetermined normal weight. Conversely, when an overweight load is placed on the platform 310, the valve 314 will be moved toward the lower orifice, thus substantially increasing the pressure in the lower bellows 344 and correspondingly decreasing the pressure in the upper bellows 342. As a result, the pointer 322 will be moved to the right a distance proportionate to the overweight deviation of the load from the predetermined normal weight.

From the above description of the embodiment of the invention illustrated in Figs. 11 to 14, it will be seen that, in common with the previously described embodiments, the opposed pressure-responsive elements are supplied with compressed air from a common source so that the air pressure from such source may fluctuate without impairing the accuracy of the weight indicated. The straight-line rolling bellows 342, 344 are constructed to quickly and accurately respond to any changes in pressure by merely rolling in or out without any stretching of the rubber tube and without friction between the turned-in or rolled-down portions, the rubber tubes being restrained to linear movement by the walls of the hollow cylindrical member 384. As a result, a relatively great linear movement may be obtained with minimum hysteresis to provide an extremely accurate movement of the weight-deviation indicating means a distance directly proportional to the differential pressure as measured by the pneumatic gauging means.

While the preferred embodiment of the invention has been herein illustrated and described, it will be understood that the invention may be embodied in other forms within the scope of the following claims.

Having thus described the invention, what is claimed is:

1. Check-weighing apparatus having, in combination, check-weighing mechanism including a weighing beam having a load supporting member, said beam being movable in response to a load on said load supporting member to be check weighed; a pair of spaced, confronting nozzles having orifices providing opposed air jets; a pair of opposed expansible bellows, each having a chamber connected with a respective nozzle in advance of the discharge orifice thereof; conduit means for supplying air under pressure to said nozzles; a valve member disposed in the path of said air jets and actuated in response to movement of said weighing beam to vary the discharge from said nozzles to increase the pressure of the air in one of said pressure chambers while simultaneously decreasing the pressure of the air in the other of said pressure chambers; and means actuated by said bellows in response to the differential pressure between the pressures in the chambers thereof for indicating the weight deviation of the load being check weighed.

2. Check-weighing apparatus as defined in claim 1 wherein the weighing beam is a cantilever spring and is provided with adjustable spring means for exerting a counterforce upon the spring beam.

3. Check-weighing apparatus as defined in claim 1 wherein the weighing beam is a cantilever spring and is provided with adjustable spring means for exerting a counterforce upon the spring beam, and wherein said adjustable spring means includes means for effecting a coarse adjustment and means for effecting a fine adjustment.

4. Check-weighing apparatus as defined in claim 1 wherein the expansible bellows comprises opposed rolling bellows, each of said rolling bellows comprising a rubber tube having one end arranged to roll upon the body of the tube.

5. Check-weighing apparatus as defined in claim 1 wherein the expansible bellows comprises opposed rolling bellows constrained to expand and retract in an arcuate path, each of said rolling bellows comprising a rubber tube having one end arranged to roll upon the body of the tube, a member connected between the rolled ends of said tubes and movable therewith upon expansion and retraction of said bellows, said indicating means including a pointer connected to and movable with said member.

References Cited in the file of this patent

UNITED STATES PATENTS

| Number | Name | Date |
|---|---|---|
| 2,076,617 | Cleaves | Apr. 13, 1937 |
| 2,264,562 | Bryant | Dec. 2, 1941 |
| 2,451,425 | Allwein | Oct. 12, 1945 |
| 2,581,204 | Reilly | Jan. 1, 1952 |
| 2,613,925 | Weber | Oct. 14, 1952 |
| 2,645,447 | Clark et al. | July 14, 1953 |